(12) United States Patent
Schmidt et al.

(10) Patent No.: US 6,426,831 B1
(45) Date of Patent: Jul. 30, 2002

(54) EIT BASED OPTICAL SWITCH/WAVELENGTH CONVERTER

(75) Inventors: Holger Schmidt; Rajeev J. Ram, both of Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/552,914

(22) Filed: Apr. 20, 2000

Related U.S. Application Data

(60) Provisional application No. 60/185,945, filed on Feb. 29, 2000.

(51) Int. Cl.[7] .................................................. G02F 1/35
(52) U.S. Cl. .......................................... 359/326; 385/16
(58) Field of Search ................................ 359/326–332, 359/117, 124, 127, 128; 372/21, 22, 39; 385/16, 24

(56) References Cited

U.S. PATENT DOCUMENTS

| | | | |
|---|---|---|---|
| 5,054,871 A | 10/1991 | Deri et al. | 385/30 |
| 5,193,131 A | 3/1993 | Bruno | 385/14 |
| 5,469,284 A | 11/1995 | Haas | 359/139 |
| 5,734,486 A | 3/1998 | Guillemot et al. | 359/139 |
| 5,754,511 A | 5/1998 | Gemma et al. | 369/100 |
| 5,771,117 A * | 6/1998 | Harris et al. | 359/326 |
| 5,796,501 A | 8/1998 | Sotom et al. | 359/119 |
| 5,818,983 A | 10/1998 | Yoshimura et al. | 385/14 |
| 5,832,015 A | 11/1998 | Goto et al. | 372/34 |
| 5,838,848 A | 11/1998 | Laude | 385/24 |

(List continued on next page.)

FOREIGN PATENT DOCUMENTS

| | | |
|---|---|---|
| DE | 195 35 772 A1 | 3/1997 |
| JP | 9-139539 * | 5/1997 |

OTHER PUBLICATIONS

Merriam et al, "Efficient Vapor–Phase Vacuum Ultraviolet (VUV) Frequency Conversion", Summaries of Papers Presented at the Conference on Lasers and Electro–Optics 1999 (CLEO '99), pp. 250–251, paper JWA4, May 1999.*

Merriam et al, "Efficient Gas–Phase VUV Frequency Up–Conversion", IEEE Journal of Selected Topics in Quantum Electronics, vol. 5, No. 6, Nov./Dec. 1999, pp. 1502–1509.*

K. L. Campman et al., "Interface Roughness and Alloy–Disorder Scattering Contributions to Intersubband Transition Linewidths", 1996 American Institute of Physics, vol. 69, 3 pgs.

Lene Vestergaard Hau et al., "Light Speed Reduction to 17 Meters Per Second In An Ultracold Atomic Gas", vol. 397, 1999, pp 1–18.

(List continued on next page.)

Primary Examiner—John D. Lee
(74) Attorney, Agent, or Firm—Daly, Crowley, & Mofford, LLP

(57) ABSTRACT

A wavelength division multiplexing (WDM) optical communication system includes an EIT based wavelength converter/switch. EIT, i.e., electromagnetically induced transparency, refers to the elimination of resonant absorption on an otherwise optically allowed transition by the application of a coherent coupling light field. In one embodiment, the EIT converter provides a 1×1 converter for converting a data stream from a first wavelength to a second wavelength. A constant wave probe field and a coherent coupling field, which has a state corresponding to data stream, are applied to the EIT medium. The converter can convert the data stream from a wavelength corresponding to the coupling field to the wavelength of the probe field. In a further embodiment, additional pairs of probe and coupling fields are applied to the EIT medium to provide an N×N converter.

31 Claims, 8 Drawing Sheets

U.S. PATENT DOCUMENTS

| | | | |
|---|---|---|---|
| 5,898,720 A | | 4/1999 | Yamamoto et al. ............ 372/39 |
| 5,900,957 A | | 5/1999 | Van Der Tol ................ 359/139 |
| 5,903,384 A | | 5/1999 | Bülow ........................ 359/332 |
| 5,909,456 A | | 6/1999 | Oka ............................ 372/22 |
| 5,959,764 A | | 9/1999 | Edagawa et al. ............ 359/326 |
| 5,970,039 A | | 10/1999 | Ichimura et al. ............. 369/116 |
| 5,978,129 A | | 11/1999 | Jourdan et al. ............. 359/326 |
| 6,028,873 A | * | 2/2000 | Yamamoto et al. ............ 372/39 |
| 6,097,532 A | * | 8/2000 | Harris et al. ................ 359/326 |

OTHER PUBLICATIONS

Stephen E. Harris, "Electromagnetically Induced Transparency", 1997 American Institute of Physics, Physics Today, vol. 50, Jul. 1997, pp. 36–42.

A. Neogi et al., "Intersubband Transitions at 1.3 and 1.55 μm in a Novel Coupled InGaAs–AlAsSb Double–Quantum–Well Structure", IEEE Photonics Technology Letters, vol. 11, No. 6, Jun. 1999, pp. 632–634.

Soeren Lykke Danielsen, et al., "Wavelength Conversion in Optical Packet Switching", Journal of Lightwave Technology, vol. 16, No. 12, Dec. 1998, pp. 2095–2108.

B. S. Ham, et al., "Efficient Electromagnetically Induced Transparency In A Rare–Earth Doped Crystal", Optics Communications 144, Dec. 15, 1997, pp. 227–230.

H. Schmidt, et al., "Tunneling Induced Transparency: Fano Interference In Intersubband Transitions", Appl. Phys. Lett. 70 (25), Jun. 23, 1997, pp. 3455–3457.

S. G. Patterson et al. "Continuous–Wave Room Temperature Operation of Bipolar Cascade Laser", Electronics Letters, Mar. 4, 1999, vol. 35, No. 5, pp. 1–2.

H. Schmidt et al.; "All–optical wavelength converter and switch based on electromagnetically induced transparency"; 2000 American Institute of Physics; pp. 3173–3175.

K.–J. Boller et al.; "Observation of Electromagnetically Induced Transparency"; Physical Review Letters; May 20, 1991; vol. 66, No. 20; The American Physical Society; pp. 2593–2596.

* cited by examiner

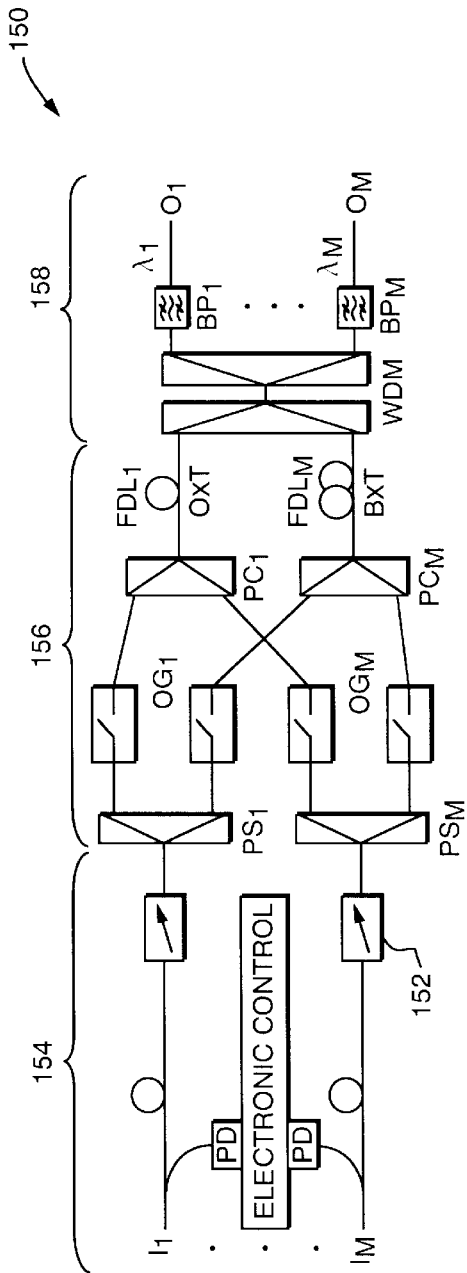
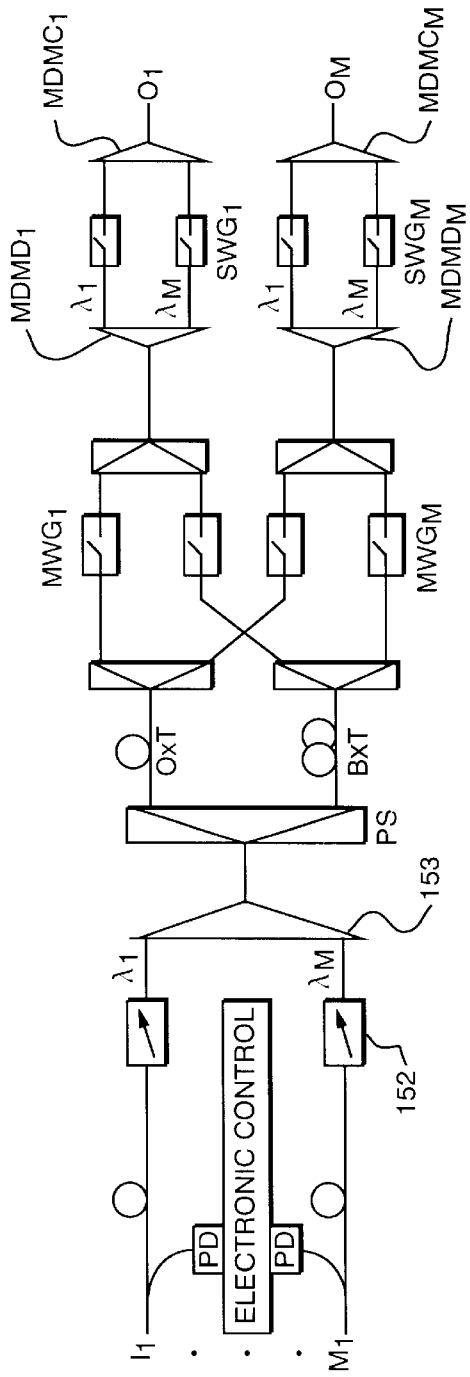
FIG. 3A
FIG. 3B

EIT BASED OPTICAL SWITCH/ WAVELENGTH CONVERTER

CROSS REFERENCE TO RELATED APPLICATIONS

This application claims priority from U.S. Provisional Application Ser. No. 60/185,945, filed on Feb. 29, 2000.

STATEMENT REGARDING FEDERALLY SPONSORED RESEARCH

The U.S. Government may have a paid-up license in this invention and the right in limited circumstances to require the patent owner to license others on reasonable terms as provided for by the terms of Grant No. N00014-99-1-0486, O.S.P. No. 6823500, awarded by the Navy.

FIELD OF THE INVENTION

The present invention relates generally to optical wavelength conversion and switching.

BACKGROUND OF THE INVENTION

All-optical signal processing, such as wavelength conversion and switching, offers the potential for operation at much higher speed than what is currently possible with electronic devices. One application for all-optical devices is fiber communication networks where ever increasing data traffic is continuously fueling the demand for system elements that facilitate fast, efficient and reliable handling of information. One known approach for providing data to a selected destination includes wavelength division multiplexing (WDM) which allows for the simultaneous optical transfer of data at different wavelengths, thereby utilizing the optical bandwidth of contemporary silica fiber. Communication networks based on WDM require optical devices with which the data flow can be controlled and directed.

WDM based systems include wavelength converters which can be used for buffering and routing of data packets. Known types of wavelength converters include cross gain modulators (XGM), four wave mixers (FWM), cross absorption modulators (XAM), and cross phase modulators (XPM). Each of these types of devices has certain disadvantages. For example, for some of these devices, such as XGM converters, the output signal is inverted and exhibits a large chirp. Further, converters which are implemented in semiconductor optical amplifiers (SOA) require strong electrical biases. Also, some of these devices have disappointing signal to noise ratios due to signal amplification. Other devices may invert the signal and may not be cascadable.

It would, therefore, be desirable to provide an optical communication system utilizing wavelength division multiplexing that overcomes the aforesaid and other disadvantages.

SUMMARY OF THE INVENTION

The present invention provides a wavelength converter based on electromagnetically induced transparency (EIT). EIT refers to the elimination of resonant absorption on an otherwise optically allowed transition by the application of a coherent coupling light field in the presence of a probe field. Although the invention is primarily shown and described as an EIT wavelength converter for an optical communication system, it is understood that the invention is applicable to other systems in which transmission of light of one color is to be controlled with light of a second color. Furthermore, the wavelength converter of the present invention is not limited to the optical wavelength range of contemporary fiber communication systems.

In one aspect of the invention, an optical communication system includes an EIT based wavelength converter that forms a portion of an optical packet switch (OPS). In general, optical packet switches are used are used to control data traffic on the level of metropolitan and local area networks (MANs, LANs). The optical packet switches allow routing of data traffic between or within different MANs and LANs. The switches require buffering and synchronization of optical packets, which can be provided by EIT wavelength converters in accordance with the present invention.

In one embodiment, the wavelength converter includes an EIT medium having as least three energy states, e.g., $|1\rangle$, $|2\rangle$, and $|3\rangle$. A continuous wave (cw) probe field is applied on a first state transition, e.g., $|1\rangle\text{–}|3\rangle$, for which the EIT medium is optically thick. In the presence of a coherent coupling field that fulfills the conditions for EIT resonance, the EIT medium becomes transparent to the probe and coupling fields. Thus, the state of the coupling field, e.g., on or off, determines the output state of the probe field. A bit pattern on the coupling field, e.g., the input, can be converted to a wavelength corresponding to the wavelength of the probe field.

In a further aspect of the invention, an optical communication system includes an EIT wavelength converter that provides N×N conversion. More particularly, a single EIT device can convert N data input signals, each having a respective wavelength, to N data output signals, each having a respective converted output wavelength. N×N conversion is realized by applying pairs of probe and coupling fields to the EIT medium, each of which can provide transparency of the EIT medium. Bit patterns on the respective coupling fields can be converted to the wavelength of the corresponding probe field. It is understood that the phase differences between probe fields are substantially identical to the phase differences between the coupling fields.

BRIEF DESCRIPTION OF THE DRAWINGS

The invention will be more fully understood from the following detailed description taken in conjunction with the accompanying drawings, in which:

FIG. 3A is a pictorial representation of exemplary optical packet switch architectures having an EIT wavelength converter in accordance with the present invention;

FIG. 3B is a pictorial representation of an alternative embodiment of an optical packet switch architecture having an EIT wavelength converter in accordance with the present invention;

DETAILED DESCRIPTION OF THE INVENTION

Figure 1:
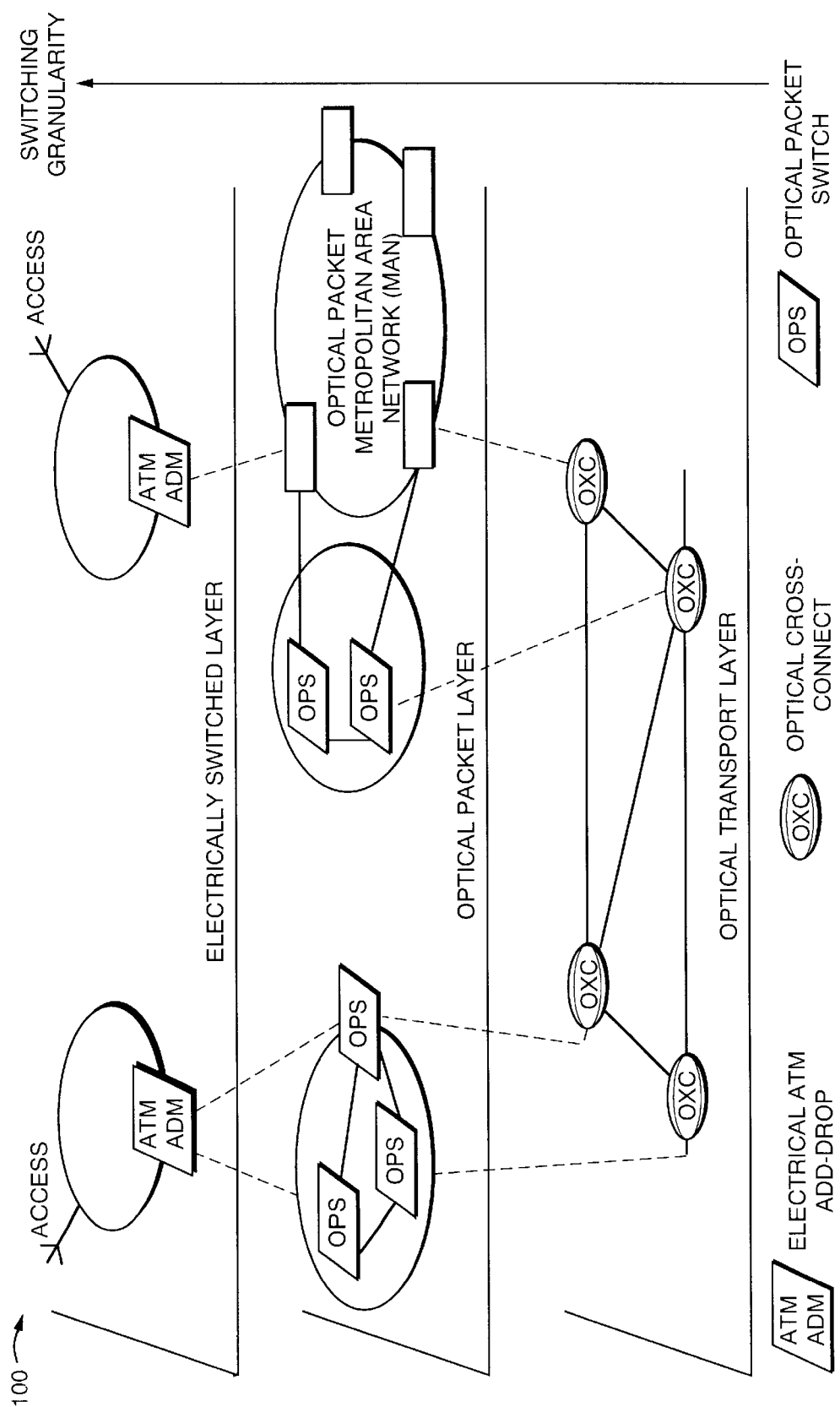
FIG. 1 is schematic block diagram of an optical communication system having EIT based wavelength converters in accordance with the present invention.

FIG. 1 shows an exemplary high speed optical communication system 100 having an EIT based wavelength converter in accordance with the present invention. Data transfer in the high-speed fiber communication system 100 occurs in different switching layers. The top layer, i.e., the electrically switched layer, uses electrical switching between different network partitions. The bottom layer, i.e., the optical transport layer, includes optically switched high-speed wavelength channels. An intermediate optical packet layer, i.e., the optical packet layer, bridges the granularity gap between the fast optical and the slow electrical switching to improve bandwidth utilization and flexibility of the network. In the packet layer, optical packet switches (OPS) are used to switch between different networks. OPS require synchronization and buffering of optical packets. EIT wavelength converters reduce data contention and increase data traffic load capacity as compared with fiber delay lines.

Figure 2A:
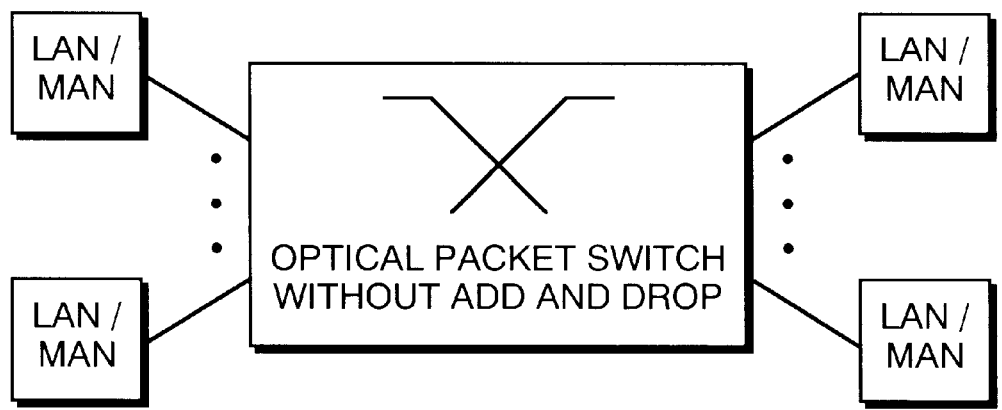
FIG. 2A is a block diagram showing switching between LANs/MANs that can form a part of the communication system of FIG. 1.
Figure 2B:
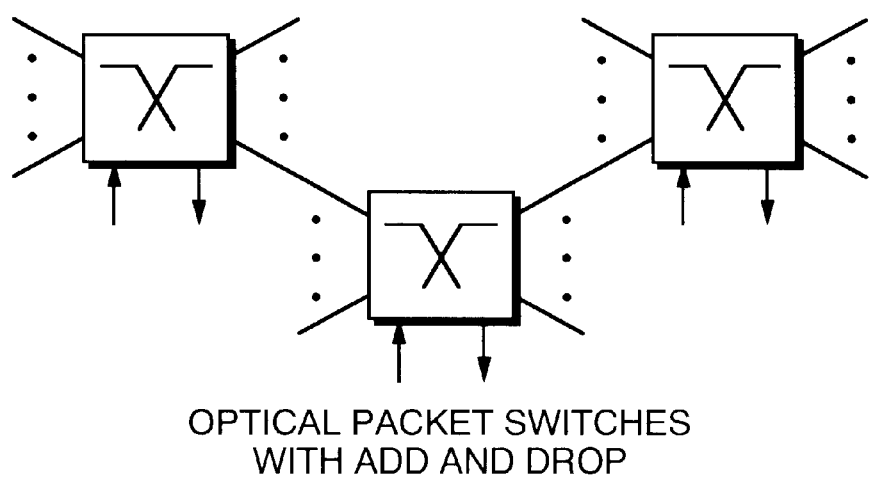
FIG. 2B is a block diagram showing switching inside LANs/MANs that can form a part of the communication system of FIG. 1.

FIG. 2A shows optical packet switches within an optical network for switching between large and metropolitan area networks (LAN, MAN) FIG. 2B shows packet switching within a single LAN/MAN. As known to one of ordinary skill in the art, optical packet switches switch data in the optical domain as the data packets remain optical signals throughout the switching process. The optical packet switches avoid data packet collisions. U.S. Pat. Nos. 5,469,284 to Haas, 5,734,486 to Guillemot et al., and 5,900,957 to Van Ser Tol disclose exemplary optical packet switching systems, all of which are incorporated herein by reference.

FIG. 3A shows an exemplary OPS architecture 150 incorporating an EIT wavelength converter 152 in accordance with the present invention. In general, the EIT wavelength converter 152 assigns each packet a wavelength corresponding to its input port, e.g., I1-M. The wavelength encoded data signals are then buffered by an optical fiber delay-line buffer and ultimately demultiplexed. In one embodiment, the OPS 150 includes a wavelength encoding section 154. The packet headers at each of the inlets I1-M are detected with photo detectors PD in order to extract information as to which outlet O1-M the packet is to be directed. Using optical fiber (indicated by a circular loop), the packets are then fed into wavelength converters 152 where each packet is assigned a wavelength that corresponds to the bandpass filter BPF1-M at the desired outlet O1-M. Contention resolution is accomplished in an intermediate section 156 via optical fiber delay-line buffering. After a passive splitter PS1-M and an optical gate OG1-M, the packets are routed through a passive coupler PC1-M to a fiber delay line FDL1-M with a length corresponding to a multiple of the packet duration (indicated by circular loops). In the output stage 158, a wavelength demultiplexer WDM in conjunction with the bandpass filters BPF1-M direct the packet to its desired output O1-M.

FIG. 3B shows an alternative embodiment of a exemplary OPS architecture 150' including an EIT based wavelength converter 152 and a WDM coupler 153. The OPS 150' includes a wavelength encoding section 154 similar to that shown FIG. 3A. Each incoming packet is assigned one wavelength through wavelength conversion identifying its input port I1-M and then fed to the packet buffer through a WDM coupler and a passive splitter PS. Due to the passive splitting, the packets experience all possible delays in the fiber delay lines of variable lengths (indicated by 0×T, B×T). The role of the multi-wavelength gates MWG1-M at the output of each delay line is to select the packet belonging to the appropriate time slot determined by the queuing situation. The wavelengths are gated simultaneously by these gates. Finally, the fast wavelength selector picks only one of these packets, i.e. one wavelength. This is done by feeding the light into single wavelength gates SWG1-M with a WDM decoupler WDMD1-M and routing them to the outputs O1-M through a WDM coupler WDMC1-M. This arrangement enables selecting the same wavelength at all or some of the outputs at the same time.

Figure 4A:
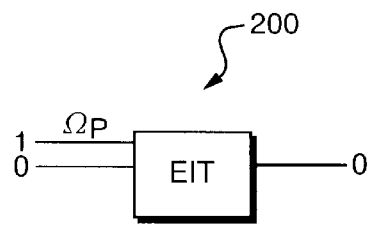
FIG. 4A is a block diagram of an EIT wavelength converter in accordance with the present invention showing a probe field applied to an EIT medium.
Figure 4B:
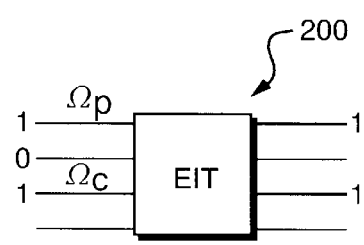
FIG. 4B is a further block diagram of the wavelength converter of FIG. 4A showing a coupling field applied to the EIT medium in addition to the probe field.
Figure 5A:
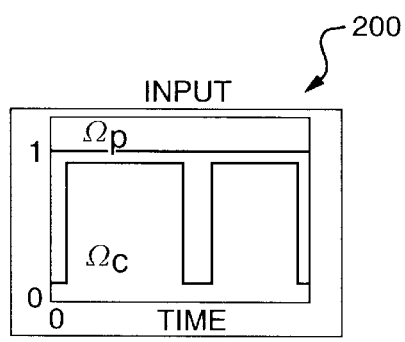
FIG. 5A is a pictorial representation of input probe and coupling fields being applied to the EIT medium of FIG. 4A.
Figure 5B:
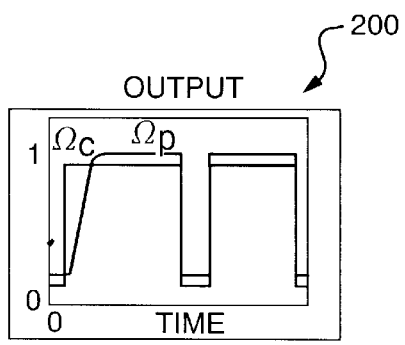
FIG. 5B is a pictorial representation of output signals from the EIT medium in response to the input signals shown in FIG. 5A.

FIGS. 4A–B and FIGS. 5A–B show an exemplary 1×1 EIT wavelength converter 200 in accordance with the present invention. In one embodiment, a cw probe signal, which has a predetermined angular frequency $\omega_p$, and Rabi frequency $\Omega_p$, corresponds to a constant logical one applied to the EIT medium. In the absence of a coupling field, the output is a logical zero when the EIT medium is optically thick for the probe field. When a coupling field signal having a predetermined angular frequency $\omega_c$, and Rabi frequency $\Omega_c$ is applied, the EIT medium becomes transparent to the applied probe and coupling fields. The coupling field $\Omega_c$ can have a state, e.g., on or off, corresponding to a bit stream such that the EIT medium becomes transparent when the coupling field corresponds to a logical one (FIG. 4B). Thus, a bit pattern on the coupling field, which has a first wavelength $\lambda_c$, can be converted to a second wavelength $\lambda_p$ corresponding to the probe field by EIT-mediated cross absorption modulation.

In a preferred embodiment, probe and coupling fields propagate collinearly inside the EIT medium while spatial overlap between both beams is maintained. Both beams are focused onto the EIT medium and recollimated after exiting the medium with optical lenses.

Figure 6:
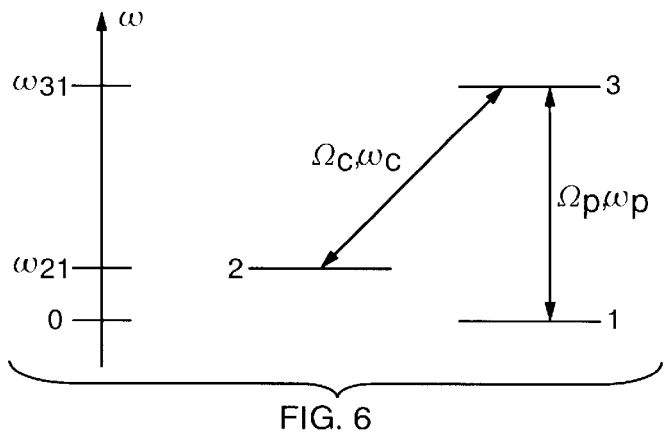
FIG. 6 is a diagram illustrating the energy levels of an exemplary EIT medium in accordance with the present invention.

Electromagnetically induced transparency (EIT) refers to the elimination of resonant absorption in a material on an otherwise optically allowed transition by the application of a coherent coupling light field, e.g., a laser. EIT can be realized in a three energy level medium called Λ-scheme, such as the one shown in FIG. 6. Two lower levels |1> and |2> are coupled to an upper state |3> by two laser fields: a (strong) coupling field having a Rabi frequency $\Omega_c$ and a (weak) probe field having a Rabi frequency $\Omega_p$. Electrons are initially in the ground state |1>.

The wavelength converter of the present invention is based on the fact that the EIT medium is only transparent for the probe field in the presence of the coupling field. Thus, wavelength conversion of data is realized by cross absorption modulation (XAM). The converter includes a medium that contains a three level EIT system. In the absence of a coupling field, the optical path length inside the EIT medium is chosen such that the medium is optically thick for a continuous wave probe field which is applied on the |1>–3> transition, i.e., a non-zero probe input (logical 1) leads to a zero output.

Figure 7A:
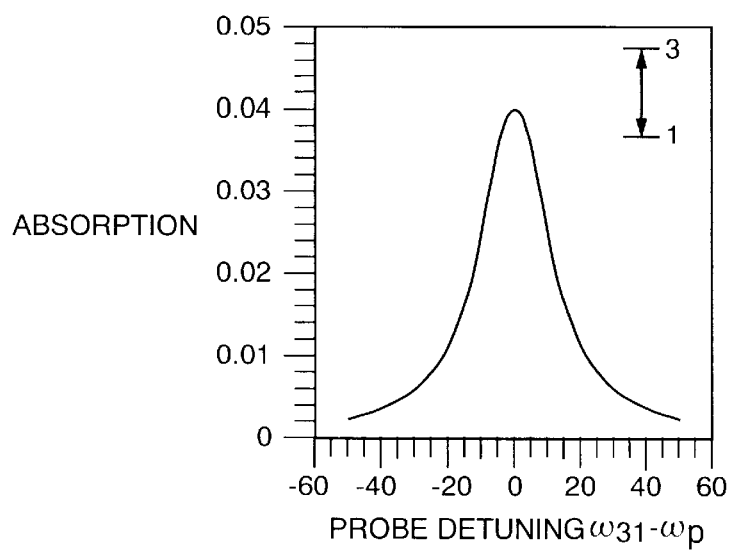
FIG. 7A is a graphical depiction of an absorption spectrum of an exemplary probe signal applied to the EIT medium of FIG. 4A.

FIG. 7A shows the absorption of the probe field in the EIT medium in the absence of the coupling field. The probe field absorption is a Lorentzian line whose width is given by the decay rate of state |3>. When the coupling field is applied, such that two-photon resonance is established, the system has a new eigenstate, which is time independent. Two photon resonance is demonstrated by the relationship shown in Equation (1) below:

$$\omega_p - \omega_c = \omega_{21} \qquad \text{Equation (1)}$$

where $\omega_p$ is the angular frequency of the probe field, $\Omega_c$ is the angular frequency of the coupling field, and $\omega_{21}$ is given by the energy difference of the two lower states ($\omega_{21} = 2\pi E_{21}/h$). Thus, two-photon resonance corresponds to identical detuning of both fields from state |3>. The corresponding time independent eigenstate is given by Equation (2) below:

$$|d> = \frac{1}{\sqrt{\Omega_p^2 + \Omega_c^2}} (\Omega_c |1> - \Omega_p |2>) \qquad \text{Equation (2)}$$

where $\Omega_p$ is the Rabi frequency of the probe signal, and $\Omega_c$ is the Rabi frequency of the coupling signal.

Figure 7B:
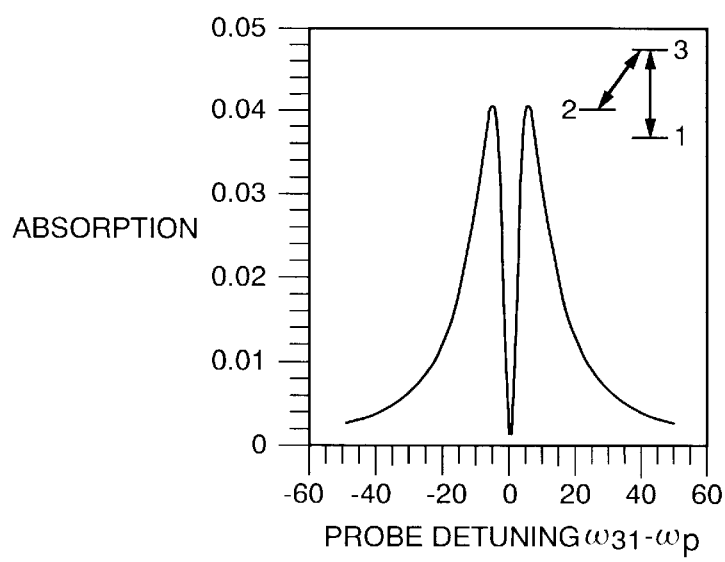
FIG. 7B is a graphical depiction of an absorption spectrum of the probe signal of FIG. 7A in the presence of a coupling signal that results in electromagnetically induced transparency of the EIT medium.

Since this state does not contain any contribution of level |3>, it is completely decoupled from level |3> thus eliminating any absorption on the |1>–|3> transition. State |d> is referred to as the so-called 'dark' or 'coherent population trapping' (CPT) state. Under application of the probe and coupling laser fields, the appropriate amount of electrons is transferred to state |2> until the dark state is established. As a result, the absorption of the probe field changes from the profile shown in FIG. 7A to the profile shown in FIG. 7B. At two-photon resonance, i.e., $\omega_{32} - \omega_c = \omega_{31} - \omega_p$, electrons are trapped in state |d> and the transition becomes transparent, as described above. This transparency manifests itself as the dip in the absorption spectrum for the probe signal as shown in FIG. 7B. The EIT phenomena is further described, for example, in U.S. Pat. Nos. 5,898,720 to Yamamota et al., and U.S. Pat. No. 5,970,039 to Ichimura et al., both of which are incorporated herein by reference.

For a wavelength converter in accordance with the present invention, FIG. 4B shows the case where a coherent coupling field is present which fulfils the aforementioned EIT resonance conditions. The EIT medium becomes transparent and the output changes to a logical one. Therefore, the state of the coupling field (on/off) is transferred to the probe field which differs from the coupling field in frequency by $\Delta\omega = \omega_{21}$. Alternatively, this process can be viewed as optical switching of the probe field transmission by the coupling field.

It is understood that the characteristics of the light fields used for the wavelength conversion are determined by the EIT medium itself. That is, the amount of wavelength shift is determined by the difference in energy of the lower states |1> and |2> for a given material. The frequency (and hence wavelength) range for the probe and coupling fields itself are given by the linewidth of state |3> and the |1>–|3> and |2>–|3> transition frequencies, respectively. In order to ensure that the medium is optically thick in the absence of the coupling field, the frequency range is about $\omega_{31} - \Gamma_3/2 \leq \omega_p \leq \omega_{31} + \Gamma_3/2$.

Referring again to FIGS. 5A–B, a bit pattern on the coupling field having a wavelength $\lambda_c$ that is converted to the probe field wavelength $\lambda_p$. It is understood that deviations of the probe field output from the coupling field output at the onset of the first pulse are due to the preparation loss associated with the transfer of electrons from the ground state to the correct dark state superposition of |1> and |2>. This preparation time $\tau_p$ depends on the linewidth of state |3> and the coupling field Rabi frequency as $$\tau_p = \alpha_p L \Gamma_3 / \Omega_c^2 \qquad \text{equation (3)}$$

where $\alpha_p$ is the optical absorption coefficient for the probe field in the absence of the coupling field and L is the length of the EIT medium. Therefore, the minimum required coupling field Rabi frequency (intensity, power) is determined by the material parameters and the tolerable preparation time, and hence the bit rate.

Figure 8:
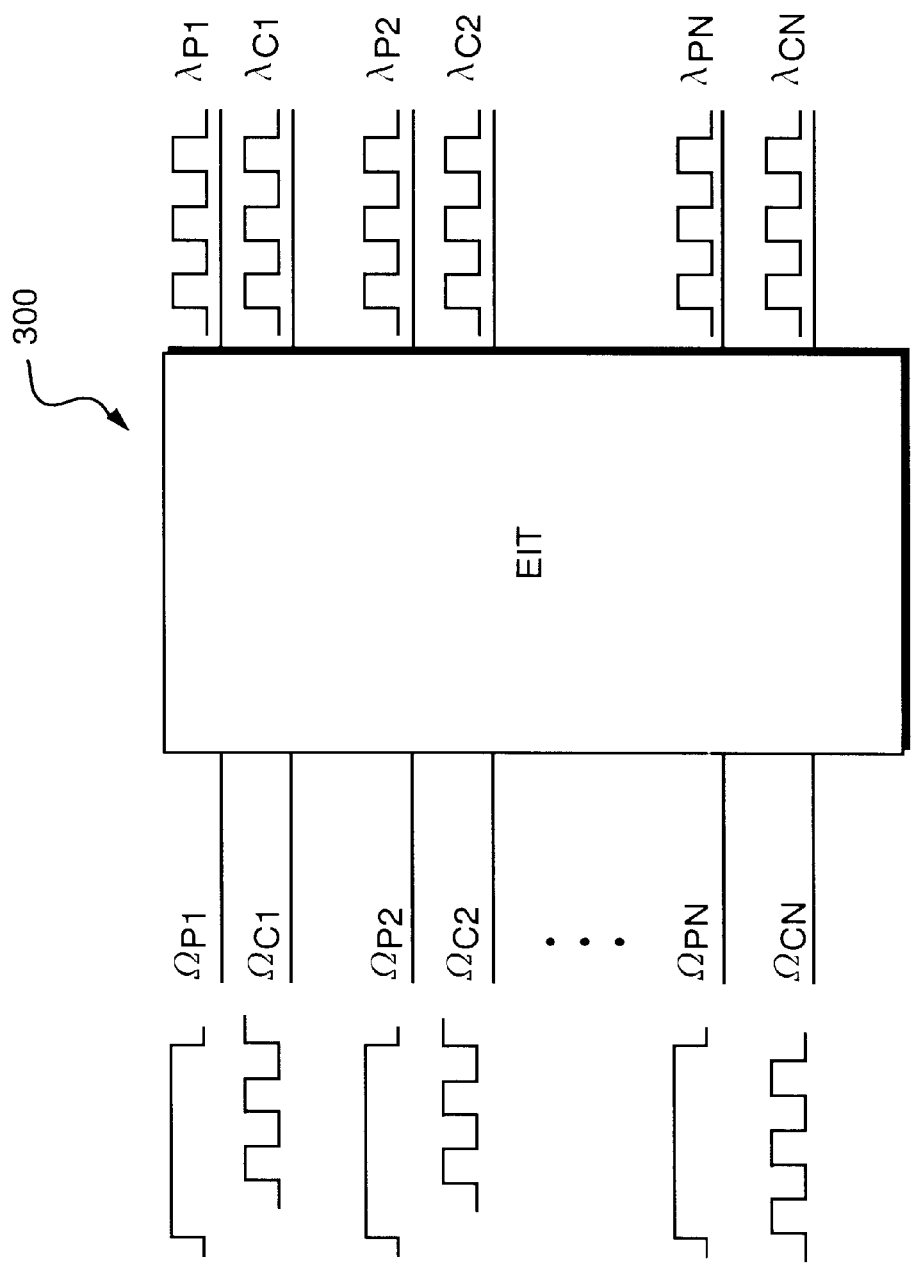
FIG. 8 is a block diagram of a further embodiment of an EIT wavelength converter in accordance with the present invention showing N×N signal conversion.
Figure 9:
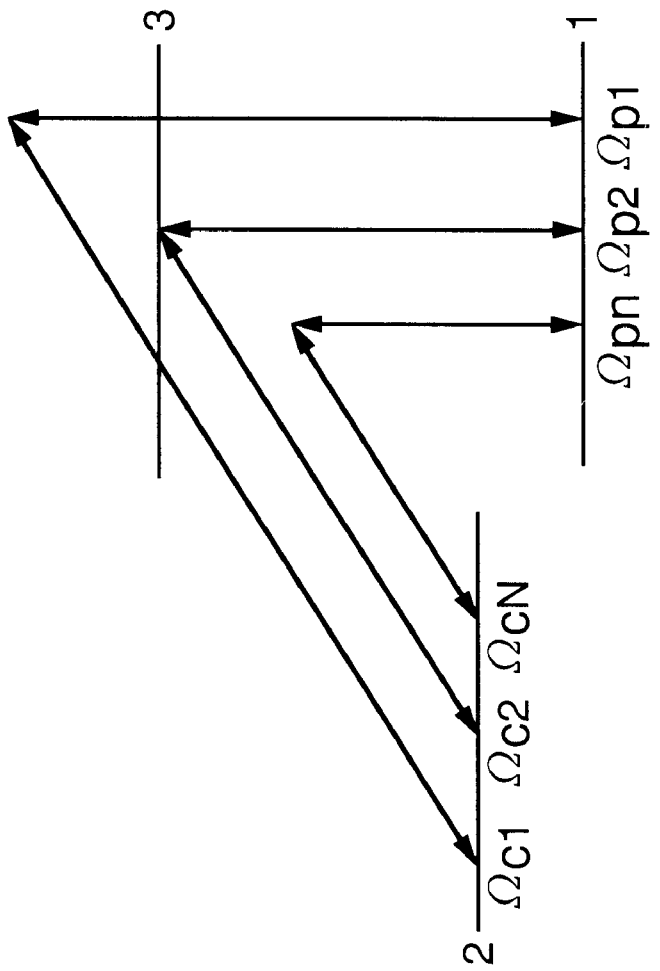
FIG. 9 is a state diagram showing the basis for N×N signal conversion in accordance with the present invention.

FIGS. 8 and 9 show a further embodiment of an EIT wavelength converter 300 in accordance with the present invention that provides simultaneous N×N wavelength conversion. More particularly, bit patterns on N input wavelengths can be converted to N output wavelengths in one device. As discussed above, EIT occurs when the two-photon detuning of coupling and probe field is zero, i.e., when their detuning from the upper state is identical. Hence, there are many different pairs of probe and coupling field wavelengths that result in EIT. Thus, if the dark state of N applied pairs is the same, this dark state is a dark state of the entire system and transparency occurs for all applied fields. This condition corresponds to the ratio of the Rabi frequencies of coupling and probe fields being identical for all applied pairs. In order for the dark state to be time-independent, it is also required that the following relation between the phases ($\phi_{pi}, \phi_{ci}$) of the various coupling and probe fields be fulfilled:

$$\phi_{ci} - \phi_{cj} = \phi_{pi} - \phi_{pj}; \text{ where } i,j=1,2,\ldots N \qquad \text{equation (4)}$$

It is understood that operating conditions for the EIT device may not be optimal in the case where not all of the coupling fields are present at any instant because some of the probe fields may be unmatched. However, the effect of these probe fields is negligible as long as they are perturbative. That is, the probe field intensities are chosen to be significantly smaller, e.g., at least ten times smaller, than the coupling field intensities.

As described above, transparency of the EIT material occurs whenever the two laser wavelengths (probe and coupling) fulfil the two-photon resonance condition. That is, the first and second states |1>, |2> are detuned from the upper state |3> by the same amount. In addition, the CPT state is a coherent superposition of the lower states |1> and |2>. Therefore, the transparency is only occurs, i.e. absorption is substantially eliminated, as long as this coherence is maintained. Coherence dephasing, which is commonly described as a decay rate of state |2>($\Gamma$2), increases the amount of absorption that is measured at the resonance. Specifically, the condition for observation of EIT is $\Omega_c^2 > \Gamma_2 \Gamma_3$, i.e. the square of the coupling Rabi frequency exceeds the product of the upper state linewidth and the dephasing rate of the dark state in order to observe an absorption modulation. While this relationship is not a part of the wavelength conversion mechanism, it may demonstrate practical limitations of an EIT wavelength converter device.

The absorption dip in FIG. 7B has a frequency width $\delta$ corresponding to the smaller value of $\Omega_c$ and $\Omega_c^2/\Gamma_3$. Therefore, an FM modulation on a continuous wave coupling field with a FM amplitude larger than $\delta$ can be converted to an amplitude modulation of the probe field because transmission at the probe frequency is strongly dependent on the instantaneous coupling frequency.

It is understood that an EIT wavelength converter in accordance with the present invention relies on the properties of the three-level scheme and can be implemented in a variety of different material systems including atomic vapors, such as Pb vapor and Alkali atom vapor (such as Na, Rb, Cs), doped fibers, such as $Pr^{3+}$ doped $Y_2SiO_5$ fiber, Bose-Einstein condensates of Na atoms, and tunneling induced transparency in semiconductor intersubband transitions, such as intersubband transitions in coupled quantum well structures (e.g., GaAs/AlGaAs, InGaAs/InAlAs, InGaAs/AlAsSb, InGaN/GaN, GaN/AlGaN). Exemplary EIT mediums include a cell filled with atomic vapor of one of the aforementioned elements, a cloud of ultracold Na atoms in a BEC condensate, a doped fiber, or a quantum well structure.

Figure 10:
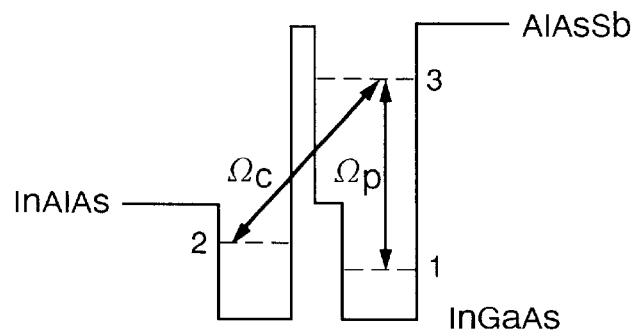
FIG. 10 is a schematic representation of the active region of a semiconductor structure of an exemplary EIT medium that can form part of an EIT wavelength converter in accordance with the present invention.

An exemplary implementation of an EIT wavelength converter of the present invention is shown in FIG. 10 having intersubband transitions in the conduction band of an asymmetric double quantum well (ADQW) structure. In one embodiment, InGaAs/AlAsSb layers are epitaxially deposited on an InP substrate. Based on the large conduction band offset between InGaAs and AlAsSb, transitions in the 1.3–1.55 $\mu$m range are feasible. As known to one of ordinary skill in the art, these wavelengths are used for data transmission via conventional optical fiber. The three-level scheme is then realized as shown and probe and coupling lasers are applied to the EIT medium as described above. The thickness of the quantum well layers in FIG. 10 is on the order of a few tens of Angstroms, such that the wavelength corresponding to the $|1> \text{–} |3>$ ($|2> \text{–} |3>$) transition is around 1.3 (1.55) $\mu$m. The wavelength difference corresponding to the $|1> \text{–} |2>$ transition is about 0.25 $\mu$m enabling conversion from between 1.3 and 1.55 $\mu$m. A thin tunneling barrier separates the two wells. In the preferred embodiment, the barrier is thick at the bottom of the well to prevent decay on the $|2> \text{–} |1>$ transition which would result in increased aborption. The barrier on the left side of the well containing state $|2>$ is made by InAlAs.

Figure 11:
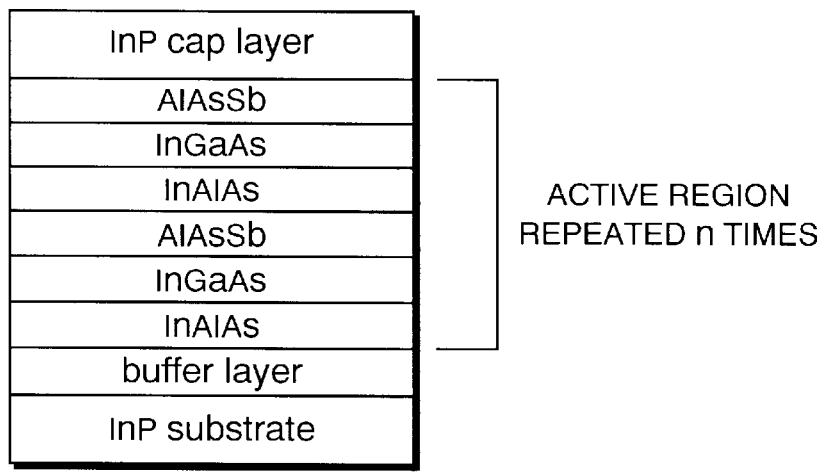
FIG. 11 is a schematic representation of an exemplary layer sequence incorporating the active region of FIG. 10.

FIG. 11 shows a schematic of the epitaxial layer structure of an exemplary device in accordance with the present invention. The layer sequence marked as active region can be repeated "n" times in order to increase the absorption of the probe in the absence of the coupling field and make the sample optically thick. The active layer is grown on top of an InP substrate and a buffer layer. An InP cap layer completes the structure. Electrons are provided to the wells by modulation n-doping in the AlAsSb barrier such that electron densities on the order of $10^{11}$ to $10^{12}$ per $cm^2$ are obtained in level $|1>$.

Figure 12:
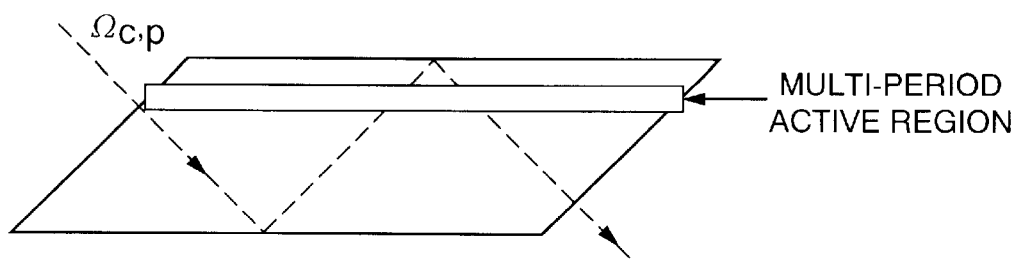
FIG. 12 is a schematic representation of light propagation by total internal reflection through the structure shown in FIG. 11.

Light is coupled in and out of the sample in a conventional waveguide structure, such as the waveguide shown in FIG. 12, which can be used for intersubband absorption measurements. The sample is cleaved to a rectangular piece and two facets are polished to a 45 degree angle using standard wafer polishing methods. The overlapping probe and coupling beams are focused onto one facet and undergo several bounces due to total internal reflection. In this way, the beams cross the active region a number of times which is given by the ratio of sample length to sample thickness. The fields exit the sample normally through the second facet.

Exemplary dimensions are $\alpha_p = 2000$ $cm^{-1}$, L=25A, t=200 $\mu$m, n=100. In order to obtain an optically thick sample for which the output probe intensity is 0.001 of the input intensity, the sample should be about 2.76 cm long. This leads to an extinction ratio of about 30 dB for the difference in transmission with and without probe field when the transparency is perfect, and to about 27 dB if EIT is reduced by dephasing such that the transmission is restored only to about 50% of the input intensity.

It is understood that dephasing in this type of coupled quantum well structures is mainly due to interface roughness scattering which leads to the requirement of extremely smooth interfaces between the different layers of the active region. It is further understood that the achievable bit rate is given by the maximum applicable coupling intensity, which is limited by damage of the sample due to heating.

In other embodiments in which the dephasing rate due to the medium itself (such as interface roughness scattering, collisional broadening in atoms etc.) is smaller than the linewidth of the coupling laser, the relevant dephasing rate is determined by the linewidth.

EIT based wavelength converters provide significant improvements over conventional wavelength converters. For example, the EIT wavelength converter of the present invention provides the ability to convert N independent input bit streams into N converted output bit streams. Known converters are generally limited to 1×1 or 1×N data conversions. In addition, in the EIT based wavelength converters of the present invention the bit rate is limited by the preparation time for the CPT state which can be reduced by increasing the coupling field intensity. The bit rate is not limited by carrier relaxation processes which is the case in other converters based on XAM. Further, the converter signal is not inverted as in other devices, such as XGM SOAs. Also, EIT based converters do not require strong electrical biases as do XGM SOAs. When implemented in semiconductor quantum wells, an external bias can, however, be used to provide the ability to manipulate the $|2> \text{–} |1>$ energy spacing and hence the amount of wavelength shift $\Delta\lambda$ using the electrical Stark shift. The noise properties of EIT converter are superior to XGM-SOAs since none of the fields are amplified and the off-state corresponds to zero transmission. EIT converters are suitable for both AM and FM conversion unlike XGM-SOAs and other intersubband converters. Furthermore, EIT converters are cascadable since the information on the coupling beam is not lost. And unlike XGM SOAs, the operation point of an EIT converter is not critical because it is not operated around saturation.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. An optical switch/wavelength converter, comprising:
    an EIT medium having at least three energy states for receiving a first optical signal having a first wavelength and a second optical signal having a second wavelength, the first and second optical signals together producing electromagnetically induced transparency in the EIT medium such that the EIT medium converts a data stream from the first wavelength to the second wavelength.

2. The converter according to claim 1, wherein the second optical signal corresponds to a logical one.

3. The converter according to claim 1, wherein an output of the EIT medium is a logical zero when one or both of the first and second optical signals are not applied to the EIT medium.

4. The converter according to claim 1, wherein the EIT medium is adapted for receiving a third optical signal having a third wavelength and a fourth optical signal having a fourth wavelength that together produce electromagnetically induced transparency in the EIT medium for converting a data pattern from the third wavelength to the fourth wavelength.

5. The converter according to claim 4, wherein the fourth optical signal corresponds to a logical one.

6. The converter according to claim 1, wherein the EIT medium is selected from the group consisting of atomic vapors, doped fibers, Bose-Einstein condensates, and intersubband transitions in semiconductor quantum well structures.

7. The converter according to claim 6, wherein the atomic vapors include Pb vapor, Na atom vapor, Rb atom vapor, and Cs atom vapor.

8. The converter according to claim 6, wherein the doped fibers include $Pr^{3+}$ doped $Y_2SiO_5$ fiber.

9. The converter according to claim 6, wherein the Bose-Einstein condensate is of Na atoms.

10. The converter according to claim 6, wherein the intersubband transitions in semiconductor quantum well structures include a quantum well structure having GaAs/AlGaAs, InGaAs/InAlAs, InGaAs/AlAsSb, InGaN/GaN, or GaN/AlGaN.

11. The converter according to claim 1, wherein the first wavelength is about 1.3 micrometers.

12. The converter according to claim 1, wherein the second wavelength is about 1.55 micrometers.

13. The converter according to claim 1, wherein the difference between the first wavelength and the second wavelength is about 0.25 micrometers.

14. The converter according to claim 1, wherein an intensity of the second optical signal is significantly less than an intensity of the first signal.

15. The converter according to claim 1, wherein an intensity of the second signal is one tenth or less that of the first optical signal.

16. A method for converting a first data pattern from a first wavelength to a second wavelength, comprising:
    applying a first optical signal having the first wavelength to an EIT medium, the first optical signal having a state corresponding to the data pattern;
    applying a second optical signal having the second wavelength to the EIT medium so as to produce electromagnetically induced transparency in the EIT medium for converting the data pattern to the second wavelength.

17. The method according to claim 16, wherein the second optical signal corresponds to a logical one.

18. The method according to claim 16, wherein an output of the EIT medium is a logical zero when one or both of the first and second optical signals are not applied to the EIT medium.

19. The method according to claim 16, further including applying a third optical signal having a third wavelength and a fourth optical signal having a fourth wavelength to the EIT medium that together produce electromagnetically induced transparency in the EIT medium for converting a second data pattern from the third wavelength to the fourth wavelength.

20. The method according to claim 16, further including selecting the EIT medium from the group consisting of atomic vapors, doped fibers, Bose-Einstein condensates, and intersubband transitions in semiconductor quantum well structures.

21. The method according to claim 20, wherein the atomic vapors include Pb vapor, Na atom vapor, Rb atom vapor, and Cs atom vapor.

22. The method according to claim 20, wherein the doped fibers include $Pr^{3+}$ doped $Y_2SiO_5$ fiber.

23. The method according to claim 20, wherein the Bose-Einstein condensate is of Na atoms.

24. The method according to claim 20, wherein the intersubband transitions in semiconductor quantum well structures include a quantum well structure having GaAs/AlGaAs, InGaAs/InAlAs, InGaAs/AlAsSb, InGaN/GaN, or GaN/AlGaN.

25. The method according to claim 16, wherein the first wavelength is about 1.3 micrometers.

26. The method according to claim 16, wherein the second wavelength is about 1.55 micrometers.

27. The method according to claim 16, wherein the difference between the first wavelength and the second wavelength is about 0.25 micrometers.

28. The method according to claim 16, wherein an intensity of the second optical signal is significantly less than an intensity of the first signal.

29. The method according to claim 16, wherein an intensity of the second signal is one tenth or less than that of the first optical signal.

30. An optical communication network, comprising:
    an optical packet switch including
        a wavelength converter for converting a data pattern from a first wavelength to a second wavelength, the wavelength converter including an EIT medium having at least three energy states for receiving a first optical signal at the first wavelength and a second optical signal at the second wavelength, the first optical signal having a state that corresponds to the data pattern, wherein the first and second optical signals together produce electromagnetically induced transparency in the EIT medium such that the EIT medium converts the data pattern from the first wavelength to the second wavelength.

31. The network according to claim 30, wherein the wavelength converter converts a further data pattern on a third optical signal at a third wavelength to a fourth wavelength, wherein the third optical signal and a fourth optical signal at the fourth wavelength produce electromagnetically induced transparency in the EIT medium regardless of whether any of the first and second optical signals are applied to the EIT medium.

* * * * *

UNITED STATES PATENT AND TRADEMARK OFFICE
CERTIFICATE OF CORRECTION

PATENT NO.    : 6,426,831 B1
DATED         : July 30, 2002
INVENTOR(S)   : Holger Schmidt et al.

It is certified that error appears in the above-identified patent and that said Letters Patent is hereby corrected as shown below:

Column 5,
Line 2, delete "A-scheme," and replace with -- Λ-scheme, --.
Line 16, delete "|1>-3>" and replace with -- |1>-|3> --.
Line 28, delete "$\Omega_c$" and replace with -- $\omega_c$ --.

Signed and Sealed this

Thirty-first Day of December, 2002

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,426,831 B1 | Page 1 of 1 |
| APPLICATION NO. | : 09/552914 | |
| DATED | : July 30, 2002 | |
| INVENTOR(S) | : Schmidt et al. | |

It is certified that error appears in the above-identified patent and that said Letters Patent is hereby corrected as shown below:

Column 1, line 9, under STATEMENT REGARDING FEDERALLY SPONSORED RESEARCH delete "The U.S. Government may have a paid-up license in this invention and the right in limited circumstances to require the patent owner to license others on reasonable terms as provided for by the terms of Grant No. N00014-99-1-0486, O.S.P. No. 6823500, awarded by the Navy." and replace with -- This invention was made with government support under Grant No. N00014-99-1-0486, awarded by the US Navy. The government has certain rights in this invention. --.

Signed and Sealed this
Seventeenth Day of May, 2011

David J. Kappos
*Director of the United States Patent and Trademark Office*